April 2, 1968 R. F. ENGELMANN 3,375,876
DRAFT SENSING METHOD AND APPARATUS
Filed Jan. 7, 1965 4 Sheets-Sheet 1
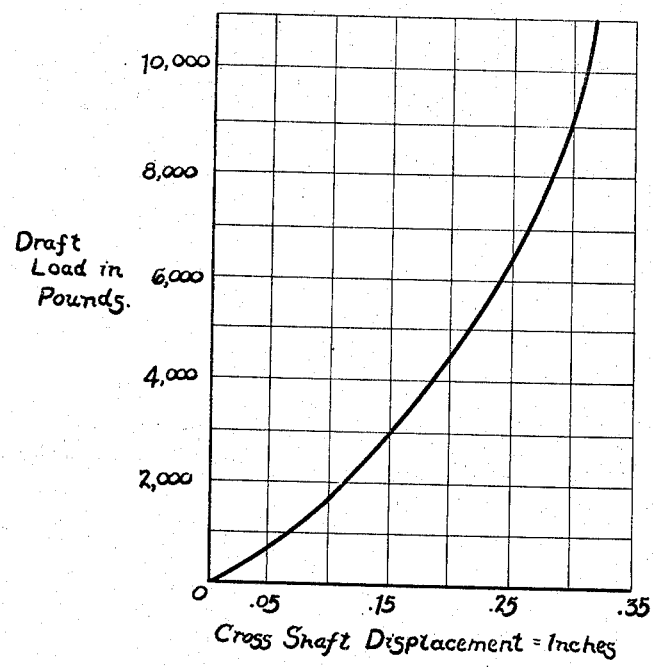
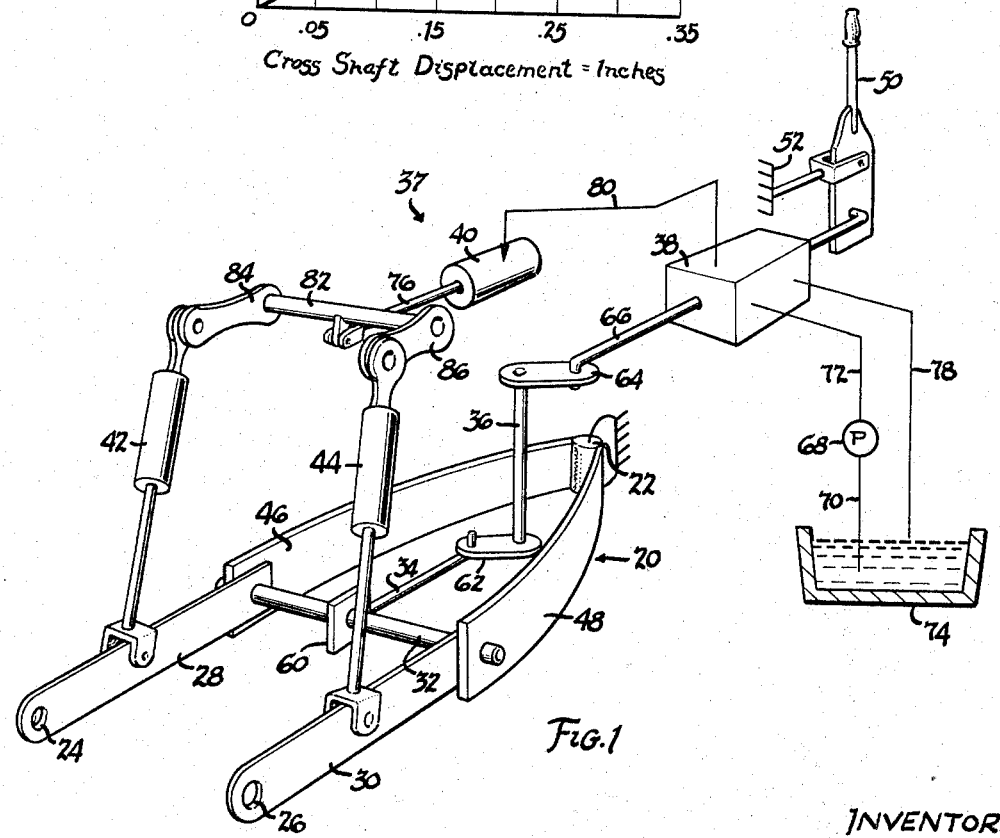
INVENTOR.
ROGER F. ENGELMANN
BY
Wilson, Settle & Craig
ATTORNEYS April 2, 1968 R. F. ENGELMANN 3,375,876
DRAFT SENSING METHOD AND APPARATUS
Filed Jan. 7, 1965 4 Sheets-Sheet 2

INVENTOR.
ROGER F. ENGELMANN
BY
Wilson, Settle & Craig
ATTORNEYS

April 2, 1968 R. F. ENGELMANN 3,375,876
DRAFT SENSING METHOD AND APPARATUS
Filed Jan. 7, 1965 4 Sheets-Sheet 3

INVENTOR.
ROGER F. ENGELMANN
BY
Wilson, Settle & Craig
ATTORNEYS

April 2, 1968 R. F. ENGELMANN 3,375,876
DRAFT SENSING METHOD AND APPARATUS
Filed Jan. 7, 1965
4 Sheets-Sheet 4
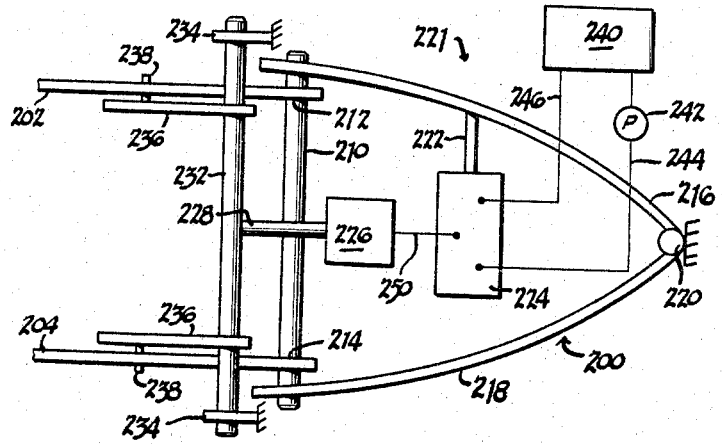
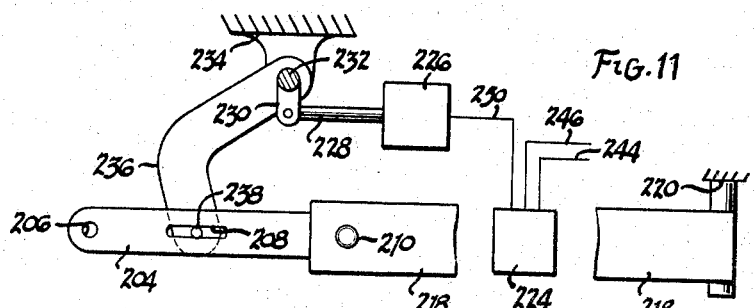
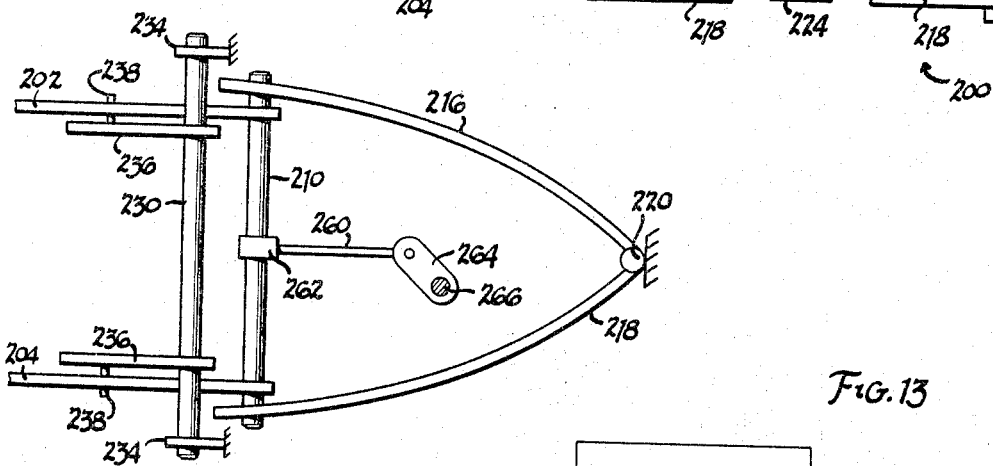
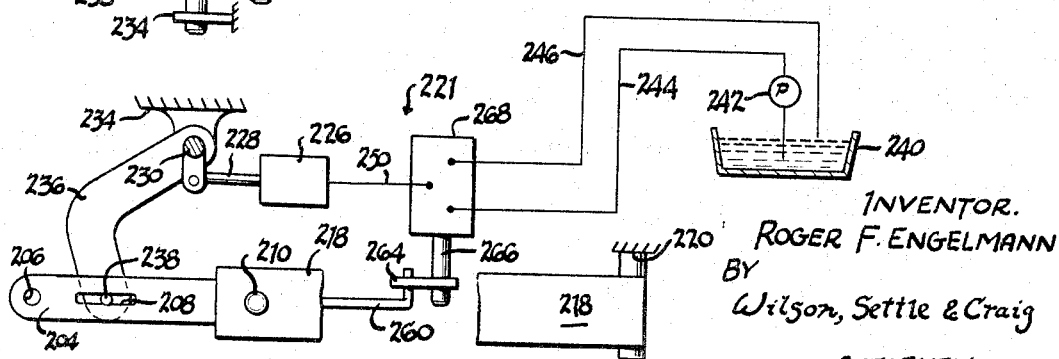
INVENTOR.
ROGER F. ENGELMANN
BY
Wilson, Settle & Craig
ATTORNEYS

# United States Patent Office 3,375,876
Patented Apr. 2, 1968

3,375,876
DRAFT SENSING METHOD AND APPARATUS
Roger F. Engelmann, Racine, Wis., assignor to J. I. Case Company, Racine, Wis., a corporation of Wisconsin
Filed Jan. 7, 1965, Ser. No. 424,004
10 Claims. (Cl. 172—1)

ABSTRACT OF THE DISCLOSURE

A draft control system for maintaining a generally constant draft-load between an implement and a tractor. A resilient frame is interposed between the implement and the tractor and is extended and contracted in response to changes in draft-load. The changes in frame length are used to generate a signal for actuating a valve which adjust the implement elevation to restore the desired magnitude of draft-load.

Background of the invention

The present invention relates generally to a draft control system for maintaining a generally constant draft on a tractor, but more specifically to a novel draft sensing system, including method and apparatus, for measuring changes in draft imposed on a tractor by a tractor-drawn agricultural implement or by an excavating implement. The sensitivity of the present sensing system preferably is responsive to variations in displacement of the sensing apparatus, which variations are created by positive and negative changes in a draft-induced load, for example, due to changes in soil resistance. Since, in this preferred system, the draft and apparatus displacement are correlated such that the draft is required to vary exponentially in order to cause the displacement of the apparatus to vary uniformly, the system is decidedly more sensitive when the draft-induced tensile load, imposed on the sensing apparatus, is relatively low and is less sensitive when the imposed load is relatively high.

In tractor-implement systems and the like, several distinct draft sensing mechanisms have, in the past, been proposed for correlating implement draft-load with implement position, ostensibly to aid in maintaining a constant draft on the tractor. By maintaining a generally constant draft on the tractor, not only is more work accomplished with less fuel, but the tractor is not overtaxed and, consequently, suffers less load-induced abuse and requires less maintenance.

Generally, draft control is usually accomplished by use of a draft-responsive apparatus which senses positive and negative variations in draft forces and thereafter acts on a draft control mechanism, which normally includes a control valve, linkage and a remote cylinder, which control mechanism alters the elevation of the implement to restore the desired constant draft. Variations in draft cause the control valve spool to shift, actuating the piston to the remote cylinder to raise or lower the implement thereby restoring the draft to the desired magnitude. A hand-control lever is often used to establish the desired draft sensing range.

In the recent past, various types of draft responsive apparatus have been proposed, examples of which are: (1) a bending bar (see U.S. Patent 2,940,530), (2) a torsion bar (see U.S. Patent 3,132,699), (3) a swinging rigid bar (see U.S. Patent 3,098,528), (4) a rigid frame (see U.S. Patent 2,996,125). Structural complexity and cost, as well as difficulty in acquiring and retaining the desired sensing accuracy, i.e., avoiding changes in the load-response characteristics of the draft responsive apparatus and their appurtenances due to ineffective ceilings, rust, wear and the like, are problems which persist in troubling the prior art developments. Often the response of these draft sensing mechanisms is generally restricted to being essentially directly responsible to the draft load imposed thereon and no provision is made for varying the load response characteristics with different magnitudes of draft required for different tractor-implement operations.

For these reasons, it is desired to provide a structurally simple, inexpensive, highly effective draft sensing system, the desired load response characteristics of the system being easily acquired, readily retained even after repeated use and weather exposure, and possessing a range of sensitivity compatible with each of the several types of tractor-implement operations.

Summary of the invention

The present invention provides such a draft sensing system. In the preferred embodiment, a resilient, flexible, wishbone-shaped frame is interposed in tensile load transmitting relation between the lower links of the tractor and the implement. The sides of the wishbone-shaped frame comprise bowed or curved draft-sensing tensile leaf springs which transfer the implement draft to the tractor generally in directions along the respective chords extending between the ends of the springs. Thus, the desired magnitude of draft for a given tractor-implement operation changes the degree of spring curvature by deflecting or displacing the springs which extend the frame into an initial position. Each positive or negative change in the draft, away from the desired magnitude of draft, causes a corresponding change in the spring deflection and accordingly, in the frame extension. The changes in frame extension or, alternatively, the changes in spring deflection or spring curvature are measured and are normally used to generate a signal to a conventional draft control system to adjust the implement elevation so that the desired magnitude of draft is restored.

The load-response characteristics of the wishbone-shaped frame are not directly proportional, but rather vary as the leaf springs tend to straighten out with increased draft, thus making the sensing system significantly more sensitive to low magnitudes of draft than to high magnitudes. Restated, the draft must vary exponentially to cause the spring deflection to vary uniformly. Thus, the wishbone-shaped frame is highly sensitive to small changes in draft when the implement is, for example, lightly cultivating about young crops where close draft control is desirable and will be less responsive to changes in draft when the implement is, for example, doing heavy plowing where over-sensitive draft control would be detrimental to production efficiency.

Accordingly, it is a primary object of this invention to provide a novel draft sensing system, including method and apparatus, for measuring changes in the draft imposed on a tractor by a tractor-drawn implement of the agricultural or earth moving types.

Another important object of this invention is provision of a novel draft sensing method and apparatus responsive to draft-imposed tensile load, the sensitivity of which is a variable which varies a uniform amount as the imposed tensile load varies exponentially.

A further object is a provision within a draft sensing system of an extensible, flexible, resilient sensing frame, the measure of extension thereof being proportional to the draft load imposed on the frame.

Another object is the provision of a curved leaf spring within a draft sensing system, the change in degree of curvature, i.e. the change in magnitude of displacement or deflection, of the springs being representive of the change in draft load imposed on the spring.

A further object is the provision of serially disposed draft sensing and draft control systems having operable components which are novelly interassociated restricting the movement of such components during operation solely to either (1) rectilinear displacement or (2) rotation, whereby easier and more durable sealing of components is accommodated.

A further object of the present invention is the provision for delivering draft correction signals from a draft sensing mechanism to a draft control mechanism solely by rotation of a draft signal shaft.

Other objects and features of this invention will become apparent from the following description and appended claims in junction with the accompanying drawings wherein:

FIGURE 1 is a schematic representation of a presently preferred draft sensing mechanism having two leaf springs forming a wishbone-shaped frame and further illustrating a conventional draft control apparatus actuatable by the sensing mechanism;

FIGURE 2 is a graphical representation of the load-response characteristics of a draft sensing device of the type depicted in FIGURE 1;

FIGURE 10 is a schematic plan view of an additional embodiment of the present invention wherein both the draft sensing and draft control mechanisms are situated at the bottom of the tractor housing with a control valve of the displaceable spool type directly actuated by changes in the deflection of the wishbone-shaped springs to actuate the draft control mechanism;

FIGURE 11 is a side elevational view partly broken away for clarity of the embodiment of FIGURE 10;

FIGURE 12 is a schematic plan view of another embodiment of this invention similar in type to the embodiment depicted in FIGURE 1, wherein the draft sensing and draft control mechanisms are located at the bottom of the tractor housing; and FIGURE 13 is a side elevational view partly broken away for clarity of the embodiment of FIGURE 12 illustrating use of a rotary control valve.

Referring now to the drawings wherein like numerals are used to designate like parts throughout, FIGURE 1 depicts a presently preferred embodiment of this invention.

Figure 3:
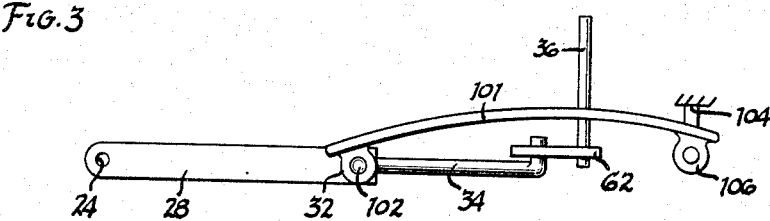
FIGURE 3 is a schematic side elevational view of another embodiment of this invention wherein the draft sensing apparatus is equipped with only one sensing spring axially extending in between the tractor and the implement.

With reference to FIGURE 1, generally speaking, a flexible resilient draft sensing frame 20 is interposed between the bottom of the tractor housing (not shown), as at a stationary connection 22 located at the forward end of the frame, and a tractor-drawn implement (not shown) attached at apertures 24 and 26 of draft arms 28 and 30, respectively. Changes in draft, with respect to whatever predetermined draft magnitude is desired for the tractor-implement operations being performed, changes the degree of extension of the draft sensing frame 20, which change is measured by the fore and aft displacement of a cross shaft 32. A draft control rod 34 is responsive to displacement of the cross shaft 32 causing rotation of a draft signal shaft 36 which changes the setting of the control valve 38 of draft control mechanism 37 thereby actuating a remote cylinder 40 to either lift or drop lift arms 42 and 44. This either raises or lowers the draft arms 28 and 30 to adjust the elevation of the implement (not shown) and restore the desired predetermined magnitude of draft.

More specifically, each change in the degree of extension which occurs in the sensing frame 20 responsive to changes, either positive or negative, in the magnitude of draft with respect to the predetermined draft is attained by means of a pair of bowed or curved tension leaf springs 46 and 48 which converge to an apex near the tractor connection point 22. As observed by inspection of FIGURE 1, in combination leaf springs 46 and 48 along with cross shaft 32 form the frame 20 which is a generally flexible, wishbone-shaped assembly. The degree of curvature present in each of the springs 46 and 48 is proportional, though not directly proportional, to the magnitude of draft exerted by the implement upon wishbone-shaped sensing frame 20 through draft arms 28 and 30.

Hand lever 50 pivotably mounted to the tractor as at 52, may be manipulated to set the draft sensing range of the apparatus illustrated in FIGURE 1 depending upon the particular tractor-implement operation to be performed. Thereafter, as the tractor pulls the implement, the leaf springs 46 and 48 will tend to straighten out changing the degree of curvature of the springs an amount proportional to the desired draft to be exerted upon the tractor for the selected operation, the force being transmitted through the springs 46 and 48 being tensile and directed generally along the chord between the ends of each spring to create the described change in degree of curvature or straightening out phenomenon.

Frame 20 being rigidly fastened at 22 to the tractor is extended or lengthened along the axis between the tractor and implement in the direction of travel, an amount proportional to the draft load by reason of the above-described change in curvature in springs 46 and 48. Having once assumed initial position responsive to the desired predetermined draft being imposed upon sensing frame 20, each positive or negative change in draft will similarly change the degree of curvature and the amount of extension of leaf springs 46 and 48 and, accordingly, will similarly alter the overall extent or length of the frame 20.

With the control valve 38 of the conventional draft control mechanism 37 properly set, by means of lever 50, the remote cylinder 40 holds draft arms 28 and 30, through lift links 42 and 44, in a constant position when frame 20 is subjected to the predetermined draft. Any positive or negative change in the draft away from the predetermined value will cause a corresponding change in the degree of curvature or extension of leaf springs 46 and 48 resulting in a corresponding displacement of cross shaft 32 either fore or aft depending upon whether the change in draft is positive or negative. Each such displacement of cross shaft 32 will displace the draft control rod 34 an identical distance by reason of the fact that rod 34 is integrally attached to the cross shaft 32 near its center by a coupling 60.

Displacement of draft control rod 34 rotates a pivotable link 62 as well as the draft signal shaft 36 and a link 64. It is significant that the sole movement of draft signal shaft 36 is rotational for reasons which will be subsequently explained. Rotation of link 64 will displace a spool shaft 66 a distance either fore or aft proportional to the magnitude of displacement of draft control rod 34, but in a direction opposite to the displacement of rod 34. Displacement of the spool rod 66 also displaces an internal valve spool (not shown) contained within control valve 38. Control valve 38 is of known conventional manufacture, as are all the components comprising the draft control mechanism 37.

Control valve 38 is constantly supplied with hydraulic fluid under pressure by pump 68 through conduits 70 and 72, the conduit 70 receiving fluid from sump 74 and the conduit 72 delivering fluid to the control valve 38. During holding when remote cylinder 40 and its piston rod 76 remain fixed, hydraulic fluid supplied by pump 68 through conduit 72 is returned to the sump 74 through a return line 78. When the valve speed (not shown) of the control valve 38 is displaced by reason of the draft control rod 34 being displaced toward the tractor, fluid is exhausted from the rear of the remote cylinder 40 through conduit 80 and discharged through the return conduit 78 into the sump 74. This retracts piston rod 76 and rotates a rockshaft 82 counterclockwise, as viewed in FIGURE 1, which in turn rotates lift links 84 and 86 in the same direction causing lift arms 42 and 44 to move downward along with draft arms 28 and 30 thereby lowering the working elevation of the implement (not shown).

When the draft exerted upon the wishbone-shaped frame 20 is greater than the desired magnitude of draft, springs 46 and 48 will be extended somewhat reducing the degree of curvature in each spring and causing the draft control rod 34 to be displaced toward the implement. This rotates the draft signal shaft 36 counterclockwise as viewed in FIGURE 1 and accommodates, through displacement of the valve spool (not shown) of the control valve 38, flow of fluid under pressure into the rear of the remote cylinder 40 through conduit 80 causing extension of the piston rod 76. Extension of the piston rod 76 rotates the rockshaft 82 clockwise as viewed in FIGURE 1 which in turn rotates the lift links 84 and 86 in the same direction to elevate the draft arms 28 and 30 through lift arms 42 and 44 thereby raising the implement.

Importantly, it is to be observed that the sensitivity of the wishbone-shaped draft sensing frame 20 is a variable depending upon the degree to which the leaf springs 46 and 48 are deflected or straightened out by reason of whatever selected predetermined draft value is desired to be imposed thereon. Significantly, the load-response characteristics of the leaf springs 46 and 48 are such that an exponential variation in draft is required to produce a uniform incremental amount of deflection or change in degree of curvature in leaf springs 46 and 48. Thus, the change in draft load imposed upon the wishbone-shaped frame 20, necessary to effect a uniform incremental change in spring deflection increases with increases in the magnitude of the load (see FIGURE 2).

In practice, this means that the wishbone-shaped draft sensing frame 20 will be significantly more sensitive to tractor-implement operations necessitating imposition of only a relatively small magnitude of draft-induced load on the sensing frame, for example, when the implement being drawn by the tractor is a cultivator. Thus, relatively small changes in draft away from the desired cultivating draft magnitude will be sensed by the wishbone-shaped draft sensing frame 20 to actuate the draft control mechanism 37 in the manner previously described thereby quickly readjusting the position of draft arms 28 and 30, which controls the elevation of the implement being drawn.

However, when the draft-induced load imposed upon the draft sensing frame 20 is relatively high as, for example, when the implement being drawn by the tractor is a multi-bottom plow, the leaf springs 46 and 48, being significantly deflected or straightened out, will not respond to relatively small changes in draft. That is, a significantly large change in draft would be required in order to actuate the draft control mechanism 37 to effect change in the elevation of draft arms 28 and 30 and of the implement. Hence, for example, slight increases in soil resistance periodically encountered during plowing will not cause the plow bottom to undulate and thereby will accommodate improved contour plowing, tending to maintain a constant depth of plow but operable to prohibit over-taxing of the plow. Therefore, when the draft being sensed is relatively high, significant changes in draft will be sensed by draft sensing frame 20, as for example, when the plow strikes an earth bound obstacle. The significant increase in draft magnitude will cause the draft control mechanism 37 to quickly respond elevating the implement through the draft arms 28 and 30 to avoid damage to the plow and the like.

Thus, by reason of the fact that the deflection of the leaf springs 46 and 48 or, alternatively, that the degree of extension of the sensing frame 20 varies uniformly as the load is exponentially increased, the desired balance is maintained between the draft and the depth of the implement by providing the requisite draft corrections depending on the range of draft being sensed.

By inspection of FIGURE 2, the relationship between the load and the sensing frame response is represented, illustrating the type of load-response characteristics achievable with the present invention using the type of wishbone-shaped draft sensing frame depicted in FIGURE 1. The sensing frame tested to determine the curve of FIGURE 2, however, was modified to include a pair of spaced curved tensile leaf springs disposed along each side of the frame. Changes in spring deflection were observed at the cross shaft, being an exponential measure of the change in draft. Clearly, the graph illustrates a greater spring or cross shaft response for changes in draft at low sensing ranges achieving the variable sensitivity previously described.

It is to be understood that the exponential relationship between the load and the deflection or sensitivity of the sensing frame may be altered depending on several variables, for example: (1) the amount of initial degree of curvature or bow pre-formed into the springs; (2) whether the cross section of the leaf springs is constant or variable; (3) material from which the springs are manufactured; (4) the number of springs utilized along each side of the wishbone-shaped frame 20; (5) the type of spring orientation (whether the springs are curved up, down, in, out or at an incline, whether the springs are composed of multi-parts spaced or contiguous with each other, etc.).

It is, of course, to be understood that the term leaf spring is used to designate the generic class of tensile springs, into which strip springs, plate springs and leaf springs and the like fall. It is further to be appreciated, and will be subsequently discussed concerning the description of the additional embodiments of this invention, that the sensing point or points at which the deflection of the leaf springs is measured may be located essentially anywhere along the springs, but preferably somewhere along the rear one-half of the springs. The size, shape and cross section, as well as the number and relationship of springs will influence the load-response characteristics of the sensing frame and should be selected to suit the desired tractor-implement operation to be performed, so that the tensile load, to which the springs are subjected, will always fall within the elastic range of the spring material.

The connection 22 (FIGURE 1) at which the draft sensing frame 20 is attached to the tractor, may constitute a bracket fixture of desired strength and configuration in order to firmly hold the forward end of the leaf springs in a stationary position during operation against the tractor housing. A simple bolt and nut clamping arrangement may be utilized to fasten the bracket fixture to the ends of the springs and spacer washers may be used to retain the forward end of the springs in any desired, spaced orientation. Preferably threaded bolts fitted through apertures in the bracket fixture secure the bracket fixture to the tractor housing.

Of course, the draft sensing device described in conjunction with FIGURE 1 as well as the other embodiments of this invention to be subsequently described may be equipped with a positive control which overrides the draft sensing apparatus to cause the implement to remain at a desired working depth, though the draft load may vary. However, inasmuch as the present invention is not concerned with positive control mechanisms, no description of such is believed necessary nor undertaken.

It is also to be appreciated that while the majority of this specification is directed toward the tractor-drawn agricultural implements, the draft sensing method and apparatus of this invention may similarly be utilized in conjunction with tractor-drawn earth moving excavation equipment and the like. Fundamentally, only the physical size and load response characteristics of the draft sensing frame need be varied to accommodate the larger magnitudes of draft normally encountered by earth moving and excavation equipment.

While all of the figures depict draft arms for attachment to the implement, it is to be appreciated that the draft sensing frame of the present invention may be interposed between the tractor and a conventional draw bar for pulling an implement. Of course, the apparatus utilized in conjunction with the draft sensing and draft control mechanisms described and illustrated in this specification are equipped with appropriate bearings and the like in the conventional manner. It is significant that the draft signal shaft 36 of FIGURE 1 is easily journaled and sealed for lubrication purposes since its sole movement is rotary.

Figure 4:
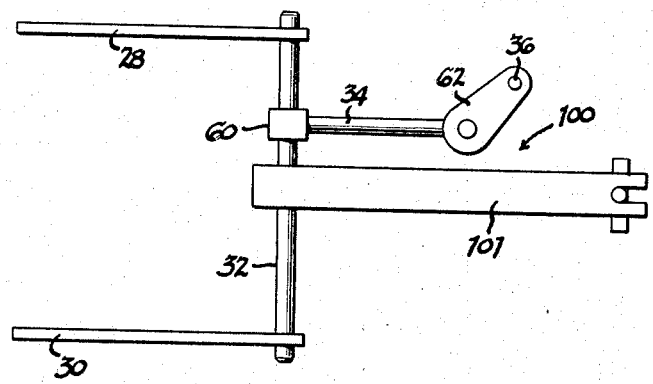
FIGURE 4 is a schematic plan view of the sensing apparatus of FIGURE 3.

Reference is now made to FIGURES 3 and 4, which illustrate a second embodiment of the present invention. Draft arms 28 and 30, cross shaft 32, draft control rod 34 with coupling 60 and link 62 as well as rotary draft signal shaft 36 are the same as the correspondingly designated parts of FIGURE 1, previously described. The embodiment of FIGURES 3 and 4 differs from the embodiment of FIGURE 1 in that this embodiment is provided with a draft sensing frame 100 comprising a single spring 101 axially disposed between the tractor and the implement and which is rotatably fastened at the rear to cross shaft 32 at journal 102 and at the front to the tractor (not shown) at connection 104 which includes a journal 106. Thus, draft imposed upon draft arms 28 and 30 is transmitted to the single leaf spring 101 in the form of a tensile load directed generally along the chord of the spring extending between the journals 102 and 106. The draft tends to straighten out spring 101 by extending it, thereby changing its degree of curvature. Once the desired sensing range has been established and the implement is operating, changes in draft, either positive or negative, result in displacement of cross shaft 32. This displacement functions to similarly displace the draft control rod 34 turning link 62 and rotating draft signal shaft 36 to actuate the draft control mechanism 37 (see FIGURE 1) in the manner previously explained to either raise or lower the elevation of the implement as necessary to restore the magnitude of draft to the desired predetermined value. Inasmuch as the spring 101 may be progressively deflective in a uniform amount only by an exponential change in load, the draft sensing frame 100, as was the case with sensing frame 20, is more sensitive at lower sensing ranges than at higher sensing ranges, though the exact load-response characteristics will differ somewhat from those of frame 20.

Figure 5:
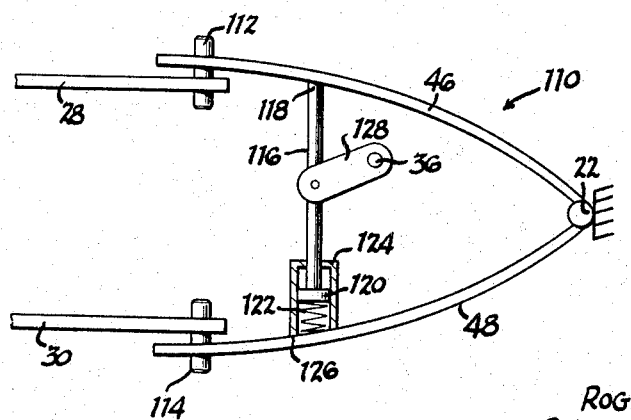
FIGURE 5 is a schematic plan view of another embodiment essentially similar to the apparatus of FIGURE 1, but modified to include a spring-loaded transverse shaft for sensing changes in curvature of the wishbone-shaped springs caused by changes in draft.

Reference is now made to the embodiment of FIGURE 5 draft arms 28 and 30, leaf springs 46 and 48 and attachment 22 being illustrated as identical with the corresponding parts of FIGURE 1, previously described. The embodiment of FIGURE 5 differs from the embodiment of FIGURE 1 in that draft sensing frame 110 interconnects with draft arms 28 and 30 by means of studs 112 and 114, respectively, rather than by means of a cross shaft. Changes in deflection or degree of curvature of leaf springs 46 and 48, therefore, are not measured by the displacement of a cross shaft but are rather directly measured by means of a spring-loaded transverse shaft 116, which is integrally attached to leaf spring 48 at 118 and includes an abutment plate 120 against which a compression coil spring 122 presses. Coil spring 122 is housed within a casing 124, which is secured to the leaf spring 46 at 126 so that one end of the compression spring 122 presses against the leaf spring 48. As draft changes are encountered, either positive or negative, the transverse shaft 116 will be displaced as the deflection of spring 46 varies. This will cause rotation of link 128 which in turn rotates draft signal shaft 36 to operate the draft control mechanism 37 (see FIGURE 1) as above described. The embodiment of FIGURE 5 essentially provides the same advantages as does the embodiment of FIGURE 1, the degree of deflection exhibited by leaf springs 46 and 48 varying exponentially with a uniform variation in draft.

Figure 6:
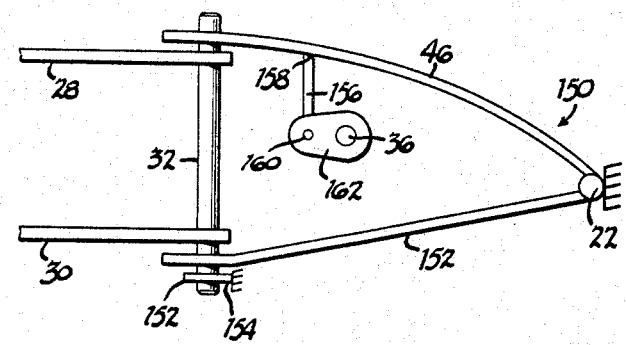
FIGURE 6 is a schematic plan view of still another embodiment of this invention wherein the draft sensing apparatus is rigidly fastened to the tractor at two positions and is equipped with only one sensing spring axially offset between the tractor and the implement.

Reference is now made to the embodiment of FIGURE 6, which includes draft arms 28 and 30, cross shaft 32 and connection 22, all of which are identical to the parts so designated and described in conjunction with the embodiment of FIGURE 1. The embodiment of FIGURE 6 differs from that of FIGURE 1 in that sensing frame 150 comprises only one offset leaf spring 46 which is deflectable responsive to the draft load. The other leaf spring, designated 48 in FIGURE 1 is replaced by a rigid frame member 152 and is supported at one end by connection 22 and at the other end by cross shaft 32. The end of cross shaft 32 which connects with rigid frame member 152 may be supported by a link 154 integrally secured to the tractor housing at connection 154. Hence, the subjection of the sensing frame 150 to draft causes the leaf spring 46 to vary in degree of deflection as the draft is varied which in turn causes cross shaft 32 to effectively pivot about its connection with rigid member 152. The changes in deflection exhibited by the leaf spring 46 as the draft varies, is sensed by a sensing rod 156 which is directly connected at 158 to the leaf spring 46 and at 160 to a link 162 to accommodate clockwise and counterclockwise rotation of the link 162 responsive to negative and positive changes in draft, respectively. Rotation of link 162 in turn rotates the previously described draft signal shaft 36 to actuate the draft control mechanism 37 (FIGURE 1) to lower or raise the implement as earlier described. Just as in the case of the previously described embodiments of this invention, the frame 150 of FIGURE 6 is more sensitive to changes in draft when the range of draft being sensed is relatively low rather than when it is relatively high. Restated, the deflection of spring 146 varies exponentially as the draft is varied uniformly.

Figure 7:
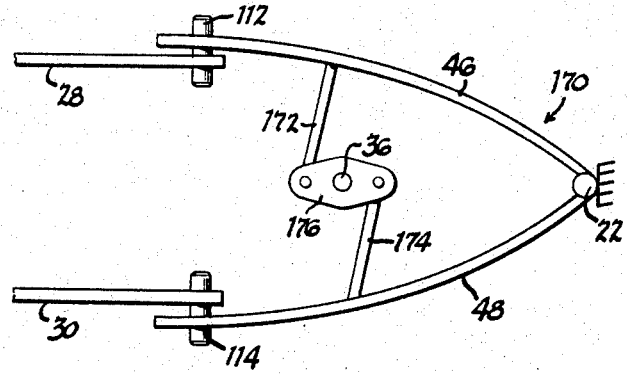
FIGURE 7 is a schematic plan view of still another embodiment of this invention similar to the embodiment of FIGURE 1 but modified to include a pair of sensing arms which measure each change in the deflection of the wishbone-shaped springs and transmit each measurement sensed to the rotary draft signal shaft which actuates the draft control mechanism through a linkage arrangement.

The embodiment of FIGURE 7 is substantially identical to the embodiment of FIGURE 1, draft arms 28 and 30, leaf springs 46 and 48, and connection 22 corresponding to the parts similarly designated in FIGURE 1 and previously described. Studs 112 and 114 earlier described in conjunction with the embodiment in FIGURE 5 are also used. Of course, studs 112 and 114 could be replaced by a cross shaft. The essential difference between the embodiment of FIGURE 1 and that of FIGURE 7 lies in the utilization of a pair of deflection sensing arms 172 and 174 to actuate a rotatable link 176 to thereby turn the draft signal shaft 36 clockwise as viewed in FIGURE 7 when sensing a reduction in draft and counterclockwise for increase in draft. This induces rotation of draft signal shaft 36 which actuates the draft control mechanism 37 (FIGURE 1) in the manner previously described.

Figure 8:
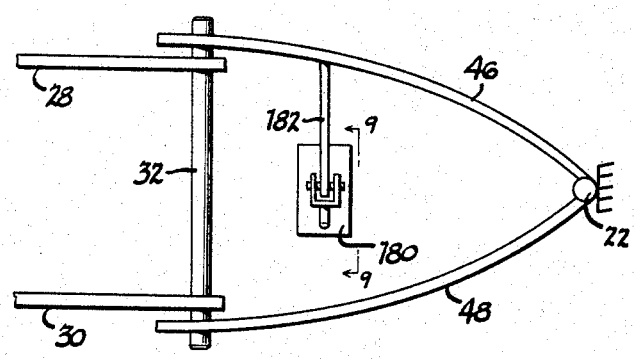
FIGURE 8 is a schematic plan view of still another embodiment of this invention being of the type depicted in FIGURE 1 but modified by utilizing a rheostat or the like for sensing changes in deflection of the wishbone-shaped springs responsive to changes in draft.
Figure 9:
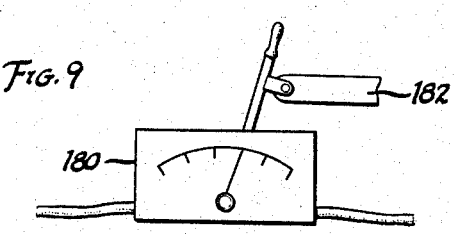
FIGURE 9 is a schematic elevational view of the rheostat of FIGURE 8 taken along lines 9—9 thereof.

Reference is now made to the embodiment of FIGURES 8 and 9 which is identical to the embodiment of FIGURE 1 except a rheostat 180, actuated by deflection sensing rod 182 an amount proportional to the change in deflection to the spring 46 caused by a corresponding change in draft, is used to generate an electrical signal proportional to the magnitude in the change in deflection of leaf spring 46. The signal so generated by a rheostat 180 is utilized to energize an electrically responsive draft control mechanism of known type to raise or lower a tractor-drawn implement an amount sufficient to restore the desired predetermined magnitude of draft.

The embodiment of FIGURES 10 and 11 and the embodiment of FIGURES 12 and 13 resemble somewhat the previously described embodiment of FIGURE 1 but differ therefrom in that both the draft sensing mechanism and the draft control mechanism of each embodiment is located adjacent the bottom of the tractor housing.

In the embodiment of FIGURE 1 the draft sensing frame 20 is situated at the base of the tractor housing but the control valve 38, remote cylinder 40 and rockshaft 82 are situated at elevated positions on the tractor housing. By placing the draft control mechanism of the embodiment of FIGURES 10 and 11 and FIGURES 12 and 13 at the bottom of the tractor housing a decrease in the cost of materials is attained and an element of compactness is provided.

With reference to the embodiment of FIGURES 10 and 11, a wishbone-shaped draft sensing frame 200 is interposed in tensile load transmitting relation between a tractor (not shown) and an implement (not shown). The implement is attached to draft arms 202 and 204 in the usual manner through apertures 206. Each draft arm is slotted at 208 for purposes which will subsequently be explained. Draft arms 202 and 204, at their forward ends, are pivotably secured to a cross shaft 210 at connections 212 and 214, respectively. Cross shaft 210 also is rigidly connected to leaf springs 216 and 218 which function in a manner analogous to the functioning of leaf springs 46 and 48 of the embodiment of FIGURE 1. The wishbone-shaped draft sensing frame 200 is rigidly secured to the tractor at connection 220.

Changes in deflection of the leaf spring 216 displaces sensing rod 222 of a control valve 224 to linearly move a valve spool (not shown) to control the supply of hydraulic fluid to single-acting remote cylinder 226, either to introduce or exhaust the fluid, depending upon whether the change in draft is positive or negative.

When the change in deflection of leaf spring 216 causes sensing rod 222 to be extended away from the control valve 224, fluid is exhausted from the rear of the cylinder 226. This causes retraction of the piston rod 228 and rotates the link 230, and the rockshaft 232, which is rotatably journaled in tractor brackets 234. Rotation of rockshaft 232, in a counterclockwise direction as viewed in FIGURE 11, causes a pair of bell cranks 236 to rotate counterclockwise with pin 238 moving toward the right in each slot 208 of the draft arms 202 and 204. This allows the draft arms to drop in elevation thereby lowering the implement, since bell cranks 236 are non-rotatably carried by the rockshaft 232.

The control valve 224 is continuously supplied with hydraulic fluid under pressure from fluid reservoir or sump 240 by pump 242 through conduit 244. Fluid not utilized is returned to the fluid reservoir or sump 240 through conduit 246.

When the draft exerted upon draft arms 202 and 204 increases so as to further decrease the degree of curvature present in leaf spring 216, the sensing rod 222 of the control valve 224 is retracted an amount proportional to the change in deflection or the change in the degree of curvature of the leaf spring 216. This movement accommodates displacement of the internal spool (not shown) within the control valve 224 allowing flow of hydraulic fluid under pressure through conduit 250 into the rear of the remote cylinder 226. This flow of hydraulic fluid extends the piston rod 228 rotating the rockshaft 232 and the bell cranks 236 clockwise. This moves the pins 238 toward the left, as viewed in FIGURE 11, along slots 208 thereby raising the elevation of the draft arms 202 and 204 which raises the elevation at which the implement is working thereby decreasing the draft and restoring the magnitude thereof to the predetermined desired level.

The embodiment of FIGURES 12 and 13 is essentially identical in structure and operation to the embodiment previously described with reference to FIGURES 10 and 11. Essential difference is that each change in deflection of the leaf springs 216 and 218 is sensed through the cross shaft 210 by means of a draft control rod 260, non-rotatably secured to the cross shaft 210 by a coupling 262. Displacement of cross shaft 210, responsive to change in the deflection of the leaf springs 216 and 218, causes rotation of link 264 and rotation of the draft signal shaft 266. A rotary control valve 268 (FIGURE 13) is actuated by rotation of the draft signal shaft 266 to control the flow of fluid to and from the remote cylinder 226. Otherwise the draft control mechanism 221 functions in the same manner as described in conjunction with FIGURES 10 and 11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a method of measuring variations in draft from an established draft value imposed upon a tractor by a tractor-drawn earth moving implement and the like, the steps of: interposing a resilient flexible frame in load transferring relation between the tractor and the implement, lengthening the flexible frame into an initial position in response to imposition of said established draft value, varying the extent of frame length in a manner proportional to changes in draft rotating a signal shaft in response to variations in frame length and changing the elevation of the implement in response to rotation of the signal shaft.

2. In an apparatus for controlling the magnitude of draft exerted upon a tractor by a tractor-drawn earth moving implement and the like, a draft sensing mechanism interposed in draft-load transmitting relation between the implement and the tractor, said draft sensing mechanism comprising a resilient frame having bowed tension springs which are deflectable an amount proportional to the draft-imposed load, a rectilinearly displaceable cross shaft actuated fore and aft by positive and negative changes in spring deflection with respect to a predetermined draft-induced deflection, a rotary draft signal shaft actuated by said cross shaft to generate a draft control signal proportional to each change in spring deflection and hydraulic means including a control valve responsive to the rotation of said draft signal shaft to change the elevation of the implement an amount proportional to each draft control signal.

3. In a method of controlling the magnitude of draft exerted upon a tractor by a drawn earth moving implement and the like, the steps of: interposing a leaf spring between the implement and the tractor, imposing on the leaf spring a predetermined draft-created tensile load generally directed along the chord extending between the ends of the leaf spring to cause the spring to assume an initial position, deflecting the leaf spring from said initial position in response to positive and negative changes in the imposed load, the change in load necessary to effect a uniform incremental change in deflection increasing with the magnitude of the load, generating a draft control signal proportional to the leaf spring deflection and changing the elevation of the implement an amount proportional to the draft control signal to thereby return the spring to substantially the initial position and the load to essentially said predetermined draft.

4. In an apparatus for sensing the magnitude of draft exerted upon a tractor by tractor-drawn earth moving equipment, a draft sensing mechanism interposed in draft-load transmitting relation between the equipment and the tractor, said draft sensing mechanism comprising a wishbone assembly including at least two bowed leaf springs deflectable an amount proportional to the imposed draft-load, means for measuring positive and negative changes in spring deflection with respect to a predetermined draft-induced deflection, means for generating a signal proportional to each measured change in spring deflection and means for sensing said signal.

5. In an apparatus for sensing the magnitude of draft exerted upon a tractor by a tractor-drawn earth moving implement and the like, a draft sensing mechanism interposed between the implement and the tractor, said draft sensing mechanism comprising a tension spring deflectable an amount proportional to changes in draft-load, means actuated by positive and negative changes in spring deflection with respect to a predetermined draft-induced deflection including a rectilinearly displaceable member and rotatable means connected to and rotated in response to displacement of said member, and means responsive to said rotatable means for generating a measurable signal proportional to each change in spring deflection.

6. In a method of controlling the magnitude of draft exerted upon a tractor by a tractor-drawn earth moving implement and the like, the steps of: interposing a leaf spring between the implement and the tractor, imposing on the leaf spring a predetermined draft-created tensile load to cause the spring to elongate into an initial position, deflecting the leaf spring from said initial position in response to positive and negative changes in the imposed load an extent proportional to each change in load, to thereby change the magnitude of spring elongation, converting each change in spring elongation into a rotational movement, using each said rotational movement to create variations in the elevation of the implement in an amount proportional to each rotational movement.

7. In an apparatus for controlling the magnitude of draft exerted upon a tractor by a tractor-drawn earth moving implement and the like, a draft sensing mechanism interposed in load-transmitting relation between the implement and the tractor, said draft sensing mechanism comprising a flexible assembly including at least one bowed leaf spring deflectable an amount proportional to the imposed draft-load, means responsive to positive and negative changes in spring deflection with respect to a predetermined draft-induced deflection, means for generating a draft control signal proportional to each change in spring deflection and means for changing the elevation of the implement an amount essentially proportional to each draft control signal.

8. Apparatus as defined in claim 7, in which said means for generating a draft control signal includes means for producing an electrical signal as a function of spring deflection.

9. In an apparatus for controlling the magnitude of draft exerted upon a tractor by an implement connected thereto, a draft sensing mechanism interposed in draft-load transmitting relation between the implement and the tractor, the improvement of said sensing mechanism comprising an extensible frame connecting the implement to the tractor, said frame having a member displaceable in response to changes in draft-load between the implement and the tractor, a signal shaft connected to said member and rotatable in response to displacement of said member, and means responsive to rotation of said signal shaft for changing the elevation of the implement to thereby maintain a substantially constant draft-load between the tractor and the implement.

10. An apparatus as defined in claim 9, in which said extensible frame includes a bowed leaf spring which is deflected essentially exponentially proportional to the changes in draft-load between the implement and tractor.

References Cited

UNITED STATES PATENTS

| | | | |
|---|---|---|---|
| Re. 25,415 | 7/1963 | Merritt et al. | 172—9 |
| 2,755,721 | 7/1956 | Rusconi | 172—4 |
| 2,940,530 | 6/1960 | Du Shane | 172—7 |
| 3,049,179 | 8/1962 | Bunting | 172—10 |
| 3,204,984 | 9/1965 | Walberg | 172—7 X |
| 3,239,012 | 3/1966 | Bunting et al. | 172—9 |
| 3,294,179 | 12/1966 | Bunting et al. | 172—7 X |

FOREIGN PATENTS 606,867  7/1960  Italy.

ABRAHAM G. STONE, *Primary Examiner.*

W. A. SMITH III, *Assistant Examiner.*